United States Patent
Gildein, II et al.

(10) Patent No.: US 10,346,936 B2
(45) Date of Patent: Jul. 9, 2019

(54) DISPOSITION MANAGER FOR RESOURCE RECOVERY

(71) Applicant: International Business Machines Corporation, Armonk, NY (US)

(72) Inventors: Michael E. Gildein, II, Wappingers Falls, NY (US); Vijai Kalathur, Wappingers Falls, NY (US); Rajaram B. Krishnamurthy, Pleasant Valley, NY (US); Christine D. Mikijanic, Monroe, NY (US); Moses J. Vaughan, Mahwah, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/701,528

(22) Filed: Sep. 12, 2017

(65) Prior Publication Data
US 2018/0204296 A1  Jul. 19, 2018

Related U.S. Application Data

(63) Continuation of application No. 15/409,610, filed on Jan. 19, 2017.

(51) Int. Cl.
*G06Q 50/16* (2012.01)
*G06F 17/50* (2006.01)

(52) U.S. Cl.
CPC ....... *G06Q 50/163* (2013.01); *G06F 17/5009* (2013.01)

(58) Field of Classification Search
None
See application file for complete search history.

(56) References Cited

U.S. PATENT DOCUMENTS

| 6,226,792 | B1 | 5/2001 | Goiffon et al. |
| 6,385,563 | B1 | 5/2002 | Vora et al. |
| 7,761,848 | B1 | 7/2010 | Chaffin |
| 8,285,522 | B1 * | 10/2012 | Tryon, III ........... G06F 17/5009 |
| | | | 702/34 |
| 9,108,797 | B1 * | 8/2015 | Borges .................. G06Q 10/30 |

(Continued)

OTHER PUBLICATIONS

Aragones, et al., "An Ontology-Based Architecture for Adaptive Work-Centered User Interface Technology", An IP.com Prior Art Database Technical Disclosure, IP.com Electronic Publication Date Mar. 8, 2006. IP.com No. IPCOM000134526D. 140 pages.

(Continued)

*Primary Examiner* — Alexander Satanovsky
*Assistant Examiner* — Lina M Cordero
(74) *Attorney, Agent, or Firm* — James L. Olsen

(57) ABSTRACT

A disposition manager configured to identify a damaged component of a damaged assembly by determining a measured first property value of a set of measured property values associated with the damaged component and obtained by a sensor is not within a range of acceptable first property values according to a specification of the damaged component. The disposition manager further configured to estimate a performance characteristic of the damaged component and a salvage value of the damaged component. The disposition manager further configured to present, to a user interface, the performance characteristic and the salvage value for the damaged component.

1 Claim, 8 Drawing Sheets

(56) References Cited

U.S. PATENT DOCUMENTS

| | | | | |
|---|---|---|---|---|
| 9,703,325 | B2* | 7/2017 | Pope | G06F 1/1656 |
| 9,881,284 | B2* | 1/2018 | Bowles | G06Q 10/30 |
| 9,885,672 | B2* | 2/2018 | Forutanpour | G06T 7/13 |
| 9,904,911 | B2* | 2/2018 | Bowles | G06Q 10/30 |
| 10,032,140 | B2* | 7/2018 | Bowles | G06Q 10/30 |
| 10,055,798 | B2* | 8/2018 | Bowles | G06Q 10/00 |
| 2007/0234772 | A1* | 10/2007 | Prevey, III | B23P 9/00 |
| | | | | 72/75 |
| 2008/0229278 | A1 | 9/2008 | Liu et al. | |
| 2011/0060568 | A1* | 3/2011 | Goldfine | G07C 3/00 |
| | | | | 703/6 |
| 2011/0178764 | A1* | 7/2011 | York | G01B 5/008 |
| | | | | 702/152 |
| 2011/0178765 | A1* | 7/2011 | Atwell | G01B 5/012 |
| | | | | 702/152 |
| 2011/0261524 | A1* | 10/2011 | Wieder | B29C 45/17 |
| | | | | 361/679.31 |
| 2012/0254046 | A1 | 10/2012 | Librizzi et al. | |
| 2013/0144797 | A1 | 6/2013 | Bowles et al. | |
| 2013/0197852 | A1* | 8/2013 | Grau | G01B 5/008 |
| | | | | 702/123 |
| 2016/0267443 | A1* | 9/2016 | Hisano | C22B 1/005 |
| 2016/0371658 | A1 | 12/2016 | Borges et al. | |
| 2017/0003113 | A1* | 1/2017 | Pettersson | G01B 11/005 |

OTHER PUBLICATIONS

Hofford, "Star: An Executable Software System Specification Language", An IP.com Prior Art Database Technical IP.com Electronic Publication Date Dec. 4, 2010. IP.com No. IPCOM000202126D. 95 pages.

Polikarpova, et al., "Specifying Reusable Components", 2010. 22 pages.

List of IBM Patents or Patent Applications Treated as Related, Sep. 10, 2017. 2 pages.

Gildein II, et al., "Disposition Manager for Resource Recovery", U.S. Appl. No. 15/409,610, filed Jan. 19, 2017.

* cited by examiner

US 10,346,936 B2

DISPOSITION MANAGER FOR RESOURCE RECOVERY

BACKGROUND

The present disclosure relates to dispositioning damaged products, and, more specifically, to identifying recoverable portions of damaged products.

SUMMARY

Aspects of the present disclosure are directed to a method comprising identifying a damaged component of a damaged assembly by determining a measured first property value of a set of measured property values associated with the damaged component and obtained by a sensor is not within a range of acceptable first property values according to a specification of the damaged component. The specification comprises acceptable ranges of property values for respective properties for the damaged component. The method further comprises estimating a performance characteristic of the damaged component based on the measured first property value and the specification of the damaged component and estimating a salvage value of the damaged component based on the set of measured property values and the performance characteristic. The method further comprises presenting, to a user interface, the performance characteristic and the salvage value for the damaged component.

Further aspects of the present disclosure are directed to a system comprising a memory and a processor. The processor can be configured to perform a method comprising extracting a plurality of measured property values from a set of data about a first object received from a sensor. The plurality of measured property values including a measured first property value. The processor can be configured to perform a method further comprising classifying the first object as damaged based on the measured first property value comprising an unacceptable first property value according to an acceptable range of first property values stored in a specification of the first object. The specification can comprise acceptable ranges of property values for respective properties for the first object. The processor can be configured to perform a method further comprising estimating a performance characteristic of the first object based on the measured first property value and the specification of the first object and estimating a salvage value of the first object based on the plurality of measured property values and the performance characteristic. The processor can be configured to perform a method further comprising presenting, to a user interface, the performance characteristic and the salvage value of the first object.

Further aspects of the present disclosure are directed to a computer program product comprising a computer readable storage medium having program instructions embodied therewith. The computer readable storage medium is not a transitory signal per se. The program instructions executable by a processor to cause the processor to perform a method comprising identifying a damaged component of a damaged assembly by determining a measured first property value of a set of measured property values associated with the damaged component and obtained by a sensor is not within a range of acceptable first property values according to a specification of the damaged component. The specification can comprise acceptable ranges of property values for respective properties for the damaged component. The program instructions executable by the processor can be further configured to perform a method comprising estimating a performance characteristic of the damaged component based on the measured first property value and the specification of the damaged component and estimating a salvage value of the damaged component based on the set of measured property values and the performance characteristic. The program instructions executable by the processor can be further configured to perform a method further comprising presenting, to a user interface, the performance characteristic and the salvage value for the damaged component.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
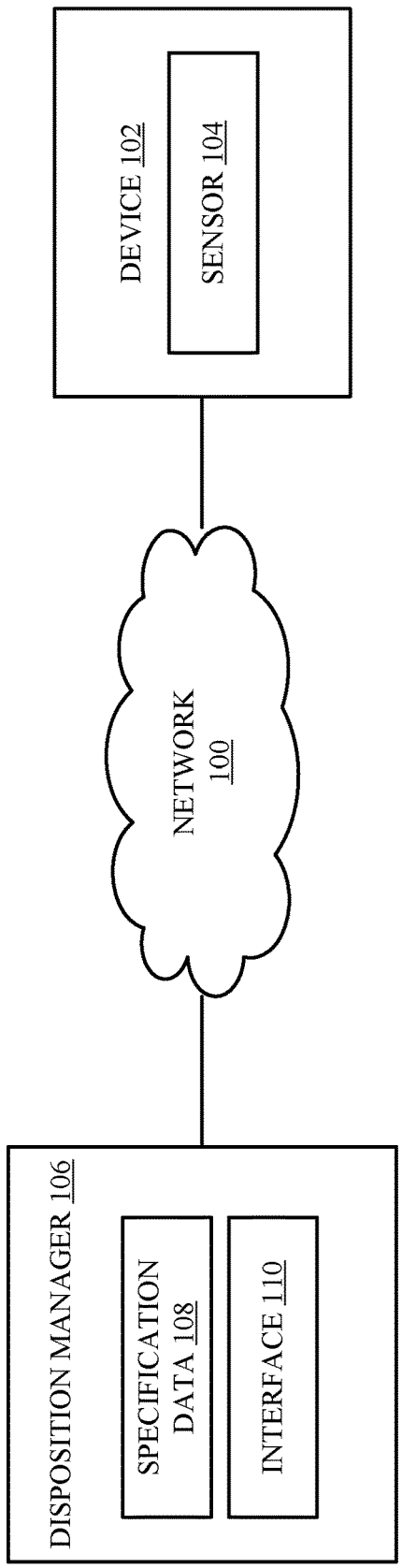
FIG. 1 illustrates a block diagram of a network that can implement aspects of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward dispositioning damaged products, and, more specifically, to identifying recoverable portions of damaged products.

Aspects of the present disclosure measure one or more property values of a damaged product and compare the one or more measured property values to nominal property values and tolerances identified in a specification for the product. Based on the comparison between the measured property values and the nominal property values and tolerances, undamaged, reusable, recyclable, and unsalvageable portions of the damaged product can be identified.

Aspects of the present disclosure provide numerous advantages. First, aspects of the present disclosure identify a damaged product, or portions thereof, according to a specification of the product. Thus, aspects of the present disclosure promote accurate damage identification based on objective measurements listed in an existing product specification. Second, aspects of the present disclosure estimate performance characteristics of a damaged product, or portions thereof. Thus, aspects of the present disclosure promote reuse of damaged products, or portions thereof, for similar or dissimilar functions based on estimated performance metrics. Third, aspects of the present disclosure estimate a salvage value of a damaged product, or portions thereof. Thus, aspects of the present disclosure promote resource recovery for non-functional components of a damaged product. Fourth, aspects of the present disclosure can collect data about a damaged product via photographs of the damaged product. Thus, aspects of the present disclosure are accessible to numerous users who can capture one or more images of various damaged products.

The aforementioned advantages are example advantages, and embodiments of the present disclosure exist that contain none, some, or all of the aforementioned advantages. Furthermore, embodiments of the present disclosure exist which provide different advantages than the advantages listed above.

Referring now to the figures, FIG. 1 illustrates a block diagram of a network in which some embodiments of the present disclosure can be implemented. The network 100 communicatively couples device 102 and disposition manager 106 to one another via a physical or wireless connection.

Device 102 collects data about a damaged product using one or more sensors 104. A damaged product can comprise an assembly (e.g., a cell phone, a bridge, a building, a vehicle, etc.), a sub-assembly (e.g., internal electrical components of a cell phone such as battery, processor, gyroscope, accelerometer, etc., a truss of a bridge, a level of a building, a frame of a vehicle, etc.), or an individual component of an assembly (e.g., a battery of a cell phone, a beam of a bridge, a joist of a building, an axle of a vehicle, etc.).

Device 102 can comprise, but is not limited to, a device that can capture images (e.g., a camera, a video camera, a microscope, an x-ray machine, an x-ray computed tomography (CT) scanner, a radiographic machine, etc.), a device that can determine dimensions (e.g., a coordinate measurement machine (CMM), etc.), a device that can determine structural characteristics (e.g., a load cell configured to test tensile, compressive, flexural, or other properties, a strain sensor monitoring strain loads resulting from tensile loads, compressive loads, flexural loads, thermal loads, or other loads, a Vickers microhardness tester, a Rockwell Hardness tester, a Brinell Hardness tester, a rheometer, an ultrasonic test apparatus, an eddy-current test apparatus, etc.), a device that can determine thermal characteristics (e.g., an infrared thermometer, a differential scanning calorimeter (DSC), etc.), a device that can determine electrical characteristics (e.g., a voltmeter, a digital multimeter, a capacitance tester, a megohmeter, an insulation tester, etc.), a device that can determine chemical characteristics (e.g., a Fourier Transform Infrared Spectrometer, an atomic spectrometer, etc.), a device that can characterize composition properties of an object (e.g., a thermogravimetric analyzer (TGA), a scale, etc.), a device that can characterize dynamic properties of an object (e.g., dynamic mechanical analyzer (DMA), a Thermal Mechanical Analyzer (TMA), etc.), or a different device capable of collecting other information about a damaged product, or portion thereof.

Device 102 contains at least one sensor 104 that is capable of measuring one or more property values of the damaged product, or portion thereof. Sensor 104 can collect data such as, but not limited to, image data, aesthetic data, dimensional data, structural data, electrical data, chemical data, thermal data, composition data, a combination of the aforementioned data, or different data.

Disposition manager 106 contains specification data 108 and interface 110. Interface 110 can present output to a user and receive input from a user. Interface 110 is described in further detail hereinafter with respect to FIG. 8.

Specification data 108 contains property data such as, but not limited to, dimensional properties, structural properties, aesthetic properties, electrical properties, thermal properties, chemical properties, composition properties, or other properties of a damaged product. Each property in the specification data can be associated with a tolerance. A tolerance can indicate a range of acceptable values for a given property.

In some embodiments, specification data 108 comprises one or more blueprints, dimensional drawings, and/or computer-aided design (CAD) models. In some embodiments, specification data includes material information (e.g., material type, material properties, material cost, etc.), manufacturing information (e.g., manufacturing processes, manufacturing times, manufacturing costs, etc.), product information (e.g., quality inspection guidelines, performance properties, test results, etc.), and/or other information.

Dimensional properties and tolerances can comprise geometric dimensioning and tolerancing (GD&T) properties such as, but not limited to, lengths, widths, heights, diameters, radii, chamfers, angles, surface finishes, countersinks, counter-bores, thread designs, and so on. Tolerances can comprise tolerances associated with individual dimensions (e.g., tolerances associated with a length, width, diameter, angle, etc.) and/or tolerances related to straightness, flatness, circularity, cylindricity, circular runout, total runout, perpendicularity, angularity, parallelism, concentricity, maximum material conditions (MMC), least material conditions (LMC), and so on.

Structural properties and tolerances can comprise, but are not limited to, strengths (e.g., tensile, compressive, flexural, shear, etc.), moduli (e.g., tensile, compressive, flexural, shear, etc.), hardnesses (microhardness, Rockwell hardness, Brinell hardness, etc.), impact strength, rheological properties, and other properties.

Aesthetic properties and tolerances can comprise, but are not limited to, smoothness, continuity, color, luminance, reflectivity, flaws (e.g., cracks, fractures, holes, scratches), corrosion, and other properties.

Electrical properties and tolerances can comprise, but are not limited to, voltage, current, resistance, capacitance, power, lifespan (e.g., as measured by milliampere hours (mAh)), and other properties.

Thermal properties and tolerances can comprise, but are not limited to, temperature, glass transition temperature, melt temperature, thermal stability, crystallinity, and other properties.

Chemical properties and tolerances can comprise, but are not limited to, flammability, toxicity, radioactivity, chemical stability, and other properties.

Composition properties and tolerances can comprise, but are not limited to, molecular weight, composition by weight fraction, composition by volume fraction, moisture content, and other properties.

Disposition manager 106 compares the measured property values received from device 102 to the specification data 108 regarding the damaged product and dispositions the damaged product based on types and magnitudes of differences between the measured property values and the nominal property values for the damaged product. In some embodiments, disposition manager 106 processes the data collected from device 102. For example, disposition manager 106 can process an image of a damaged product received from device 102 and generate measured dimensional property values based on the image. Disposition manager 106 is described in more detail hereinafter with respect to FIG. 2.

Figure 2:
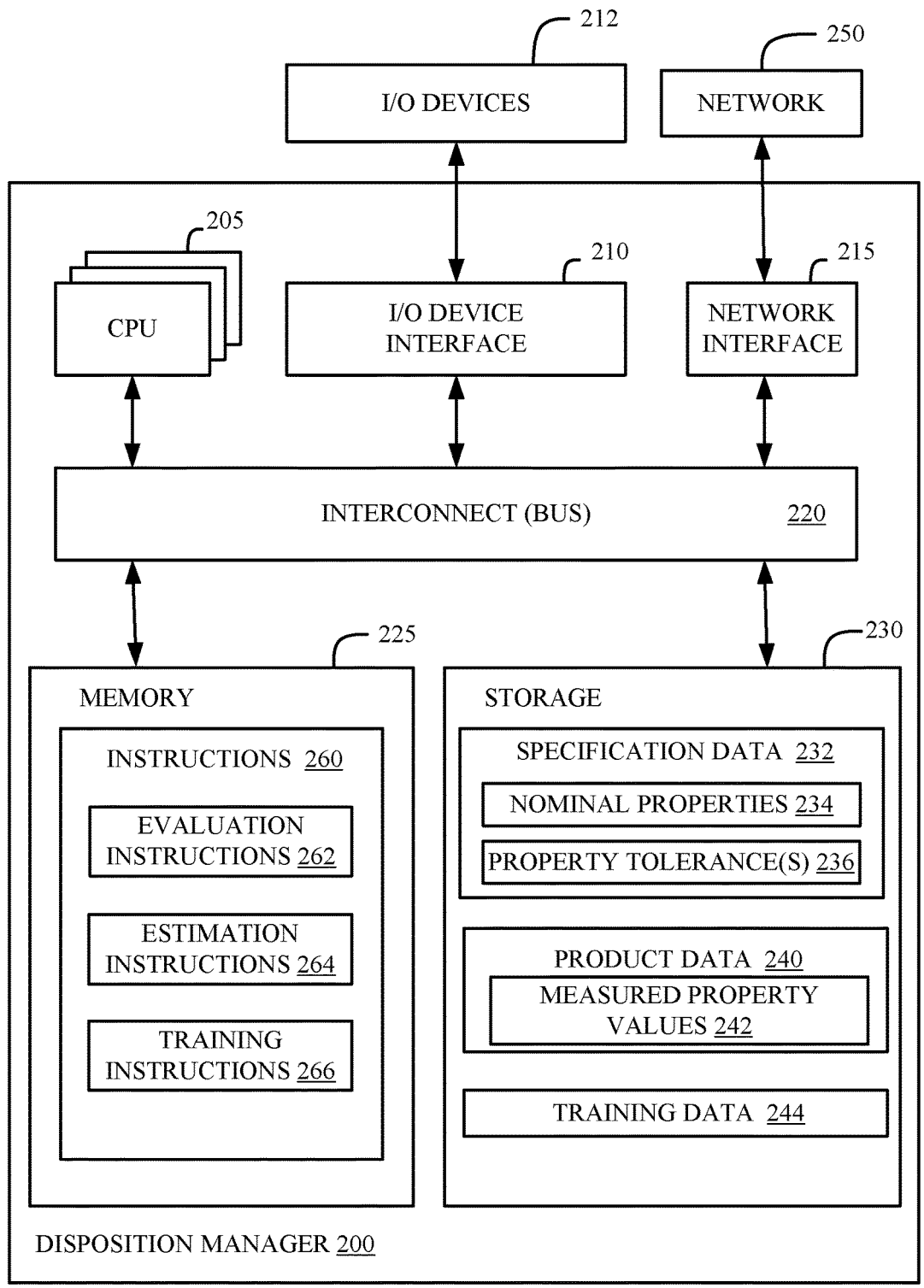
FIG. 2 illustrates a block diagram of a disposition manager in accordance with some embodiments of the present disclosure.

Referring now to FIG. 2, illustrated is a block diagram of a disposition manager 200 in accordance with some embodiments of the present disclosure. In some embodiments, the disposition manager 200 is consistent with disposition manager 106 of FIG. 1. In some embodiments, disposition manager 200 performs operations in accordance with FIGS. 3-7 as described in further detail hereinafter. The disposition manager 200 can include a memory 225, storage 230, an interconnect (e.g., BUS) 220, one or more processors 205 (also referred to as CPUs 205 herein), an I/O device interface 210, I/O devices 212, and a network interface 215.

Each CPU 205 retrieves and executes programming instructions stored in the memory 225 or storage 230. The interconnect 220 is used to move data, such as programming instructions, between the CPUs 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the disposition manager 200 via the I/O devices 210 or a communication network 250 via the network interface 215.

In some embodiments, the memory 225 stores instructions 260 and the storage 230 stores specification data 232, product data 240, and training data 244. However, in various embodiments, the instructions 260, the specification data 232, the product data 240, and the training data 244 are stored partially in memory 225 and partially in storage 230, or they are stored entirely in memory 225 or entirely in storage 230, or they are accessed over a network 250 via the network interface 215.

Storage 230 contains specification data 232, product data 240, and training data 244. In some embodiments, specification data 232 is consistent with specification data 108 of FIG. 1. Specification data can comprise, but is not limited to, aesthetic data, dimensional data, structural data, electrical data, chemical data, thermal data, material data, cost data, lifespan data, statistical data, risk data, and other data related to the product. Specification data 232 can include nominal properties 234 and property tolerances 236. Nominal properties 234 indicate an ideal property value. Property tolerances 236 represent an acceptable deviation from the nominal property 234. Nominal properties 234 and property tolerances 236 can refer to, but are not limited to, dimensional properties and tolerances, structural properties and tolerances, aesthetic properties and tolerances, electrical properties and tolerances, thermal properties and tolerances, chemical properties and tolerances, composition properties and tolerances, and/or other properties and tolerances.

Product data 240 can comprise measured property values 242. Measured property values 242 can be received from I/O devices 212 or via network 250. In some embodiments, measured property values 242 are measured by a sensor in a device (e.g., sensor 104 in device 102 of FIG. 1) communicatively coupled to the distribution manager 200 via network 250. In some embodiments, measured property values 242 are derived from data received from I/O devices 212 or from network 250. For example, the measured property values 242 can be dimensions derived from one or more images received from the I/O devices 212 or network 250 based on a known dimension contained within the one or more received images.

Training data 244 comprises a repository of historical information related to a respective product associated with the specification data 232. Training data 244 can comprise, but is not limited to, measured property values of a plurality of units of the respective product, or portions thereof, conditions of the plurality of units of the respective product, or portions thereof, images of the plurality of units of the respective product, or portions thereof, and other data. Respective images of respective units can be annotated with respective conditions based on user input where the user has domain knowledge of the damaged product. Likewise, respective measured property values of respective units, or portions thereof, can be annotated with respective conditions based on user input where the user has domain knowledge of the damaged product. Thus, training data 244 can be used by disposition manager 200 to develop correlations between respective conditions and respective combinations of measured property values based on the historical data provided for the plurality of units of the respective product, or portion thereof. Training data 244 is described in further detail hereinafter with respect to FIG. 7.

The instructions 260 store processor executable instructions for various methods such as the methods shown and described hereinafter with respect to FIGS. 3-7. The instructions can include evaluation instructions 262, estimation instructions 264, and training instruction 266.

Evaluation instructions 262 store processor executable instructions for identifying damaged, undamaged, reusable, recyclable, and/or unsalvageable components of a damaged product. Evaluation instructions 262 are discussed in greater detail hereinafter with respect to FIGS. 3 and 4.

Estimation instructions 264 store processor executable instructions for estimating one or more performance characteristics and a salvage value of a damaged product or portion thereof. Estimation instructions 264 are described in further detail hereinafter with respect to FIGS. 3, 5, and 6.

Training instructions 266 store processor executable instructions for training disposition manager 200 to predict a condition of a damaged product, or portion thereof, based on training data 244. Training instructions 266 are described in further detail hereinafter with respect to FIG. 7.

In various embodiments, the I/O devices 212 can include an interface capable of presenting information and receiving input. For example, I/O devices 212 can receive input from a user and present information to a user interacting with disposition manager 200 and/or a device (e.g., device 102 of FIG. 1).

In some embodiments, the network 250 is consistent with network 100 of FIG. 1. The network 250 can connect (via a physical or wireless connection) the disposition manager 200 with a device (e.g., device 102 of FIG. 1) that measures property values of a damaged product.

Figure 3:
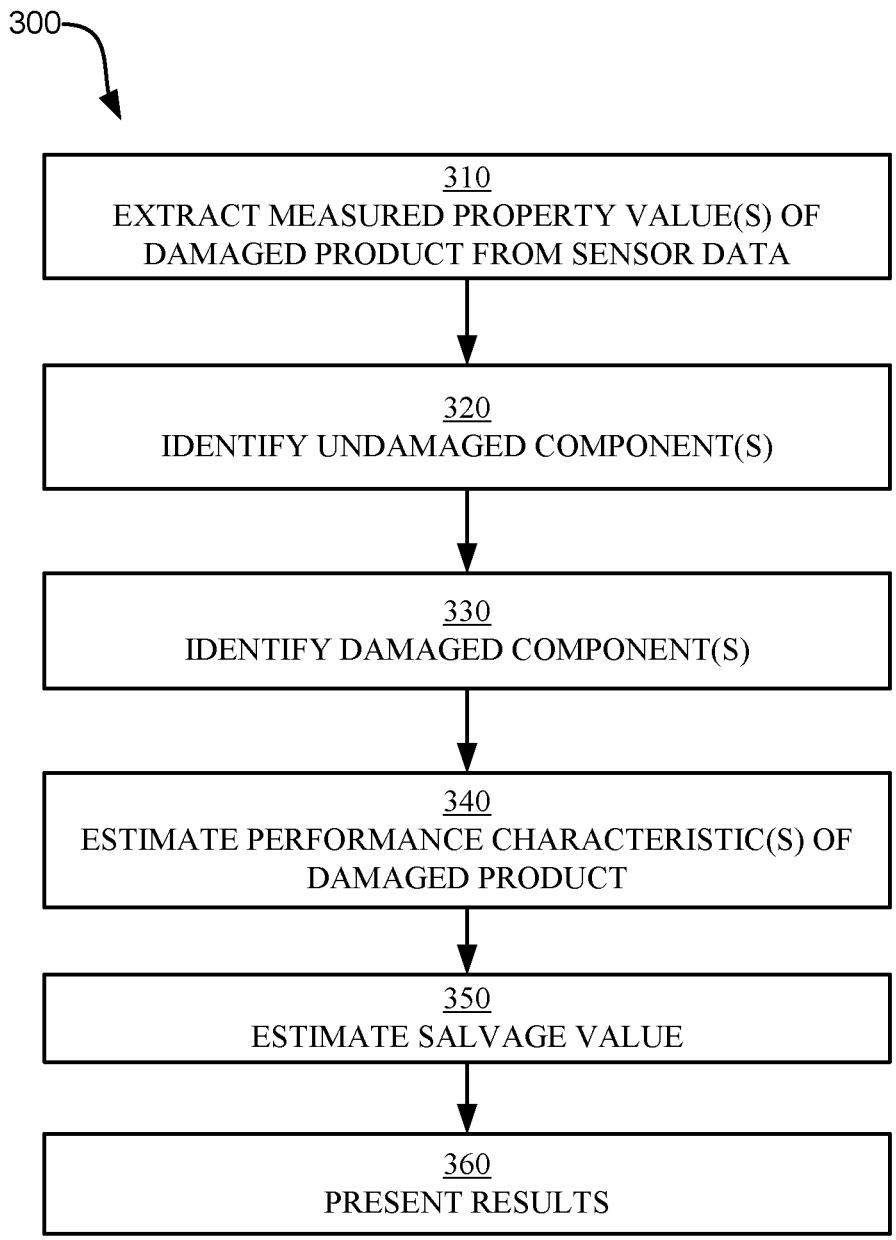
FIG. 3 illustrates a flowchart of an example method for dispositioning a damaged product in accordance with some embodiments of the present disclosure.

Referring now to FIG. 3, illustrated is an example flowchart for dispositioning a damaged product in accordance with some embodiments of the present disclosure. In some embodiments, the method 300 can be executed by one or more processors executing a set of instructions (e.g., processors 205 executing evaluation instructions 262 and estimation instructions 264 as shown and described in FIG. 2). In some embodiments, the method 300 can be executed by a disposition manager functioning in a network (e.g., disposition manager 106 connected to network 100 as shown and described in FIG. 1).

The method 300 can begin in operation 310 by extracting at least one measured property value from data collected from a damaged product. Damaged product data can be obtained by a sensor (e.g., sensor 104 in device 102 of FIG. 1). Operation 310 can, for example, extract dimensional property values from image data of a damaged product, extract engineering property values (e.g., stress and strain) from load testing data from a damaged product, and so on. Property values can include, but are not limited to, dimensional properties, structural properties, electrical properties, chemical properties, thermal properties, composition properties, and/or aesthetic properties. Measured property values can be stored in a storage (e.g., measured property values 242 in storage 230 of FIG. 2).

Operation 320 can identify at least one undamaged component of a damaged product. Operation 320 can identify an undamaged component of a damaged product based on all the measured property values being within a tolerance of a nominal property value identified in a specification of the product (e.g., measured property values 242 compared to nominal properties 234 and property tolerances 236 contained in specification data 232 of FIG. 2). Operation 320 is described in further detail hereinafter with respect to FIG. 4.

Operation 330 can identify at least one damaged component of a damaged product. Operation 330 can identify a damaged component of a damaged product based on at least one measured property value being unacceptable based on a tolerance of a nominal property value identified in the specification of the product (e.g., a measured property value 242 outside of a property tolerance 236 for a nominal property value 234 contained in specification data 232). Operation 330 is described in further detail hereinafter with respect to FIG. 4.

Operation 340 can estimate at least one performance characteristic for at least one component of the damaged product. Operation 340 can estimate at least one performance characteristic based on measured property values, nominal property values, property tolerances, specification data, and/or training data (e.g., measured property values 242, nominal properties 234, property tolerances 236, specification data 232, and/or training data 244 of FIG. 2). Example performance characteristics include, but are not limited to, a percentage of a nominal property value, a modified load rating, a lifespan, a safety risk, a probability of failure, and so on. Operation 340 is described in further detail hereinafter with respect to FIG. 5.

Operation 350 can estimate a salvage value of one or more damaged components of the damaged product. Operation 350 can estimate a salvage value based on measured property values, nominal property values, property tolerances, specification data, and/or training data (e.g., measured property values 242, nominal properties 234, property tolerances 236, specification data 232, and/or training data 244 of FIG. 2). For example, an estimated salvage value can be based on an amount of recyclable material in a damaged component and a value of the recyclable material. Operation 350 is described in further detail hereinafter with respect to FIG. 6.

Operation 360 can present the results of any of the operations 310-350 to a user interface. In some embodiments, operation 360 presents one or more of a condition, an estimated performance characteristic, and a salvage value for each component of the damaged product. Operation 360 is described in further detail hereinafter with respect to FIG. 8.

Following is a non-limiting example of the method 300 applied to a damaged cell phone. Multiple photographs of the damaged cell phone can be taken including a first photograph of the outside of the cell phone showing a cracked cell phone cover and a second photograph of the inside of the cell phone showing a battery and other electrical components. Operation 310 can extract aesthetic property measurements and dimensional property measurements of the damaged cell phone based on the first and second photographs. Operation 320 can identify the battery is physically undamaged based on the measured dimensional property values being within the nominal dimensional values and tolerances and the measured aesthetic property values of the battery being within the nominal aesthetic property values and tolerances of the battery according to the specification data of the battery. Operation 330 can identify the cell phone case is damaged based on measured aesthetic property values failing to meet the nominal aesthetic property values and tolerances stored in the specification data for the cell phone cover. Operation 340 can estimate performance characteristics such as an estimated battery life of the battery, an estimated flexural strength of the damaged cell phone cover, and/or other performance characteristics. Operation 350 can estimate a salvage value based on reusing, recycling, or disposing various portions of the damaged cell phone. Operation 360 can present the results to a user interface. The previous example is made for illustrative purposes and is not intended to limit the present disclosure.

Figure 4:
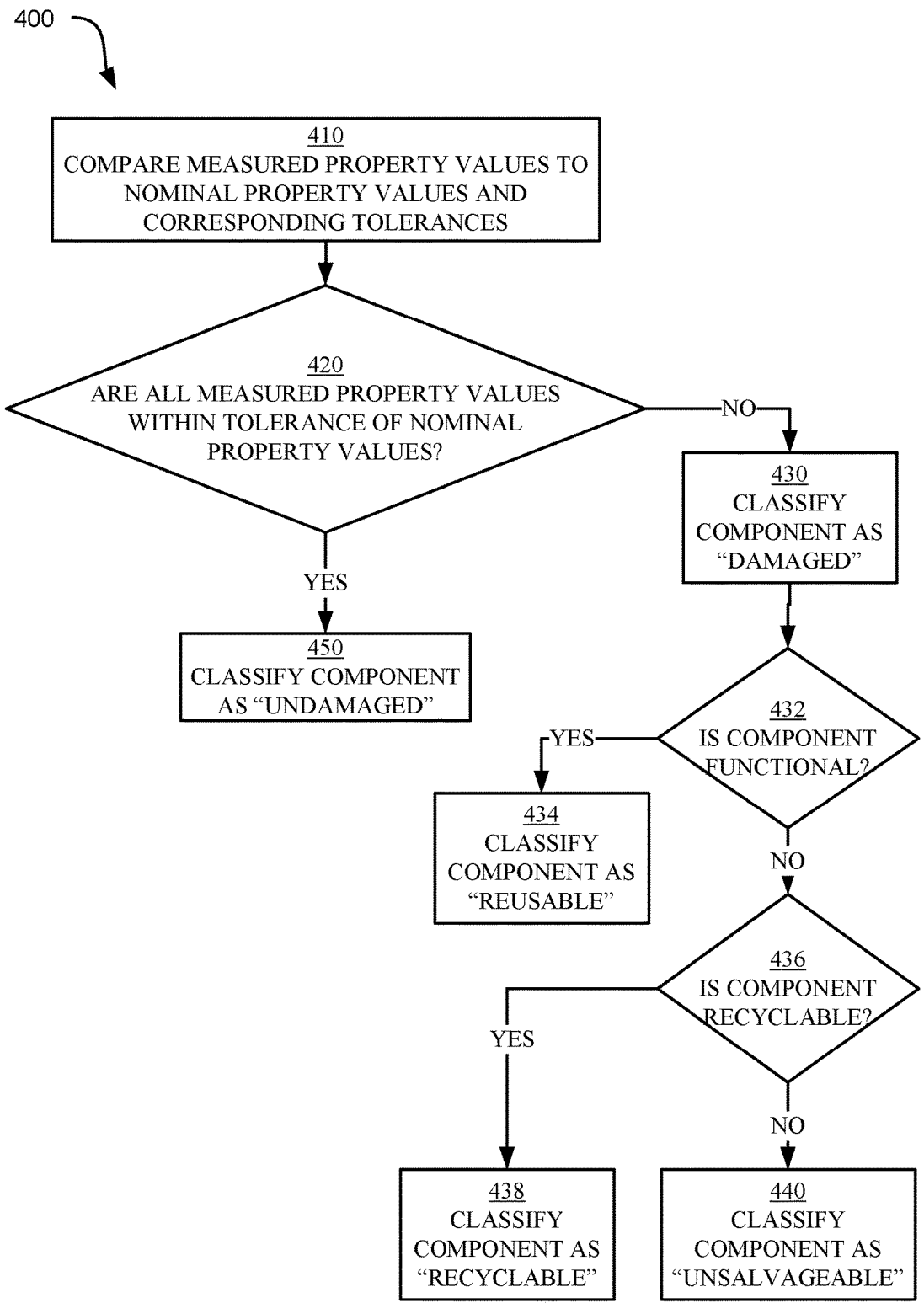
FIG. 4 illustrates a flowchart of an example method for identifying damaged and undamaged components of a damaged product in accordance with some embodiments of the present disclosure.

Referring now to FIG. 4, illustrated is an example flowchart for identifying damaged and undamaged components of a product in accordance with some embodiments of the present disclosure. The method 400 can be applied to an assembly and/or multiple components within an assembly. In some embodiments, the method 400 can be executed by one or more processors executing a set of instructions (e.g., processors 205 executing evaluation instructions 262 as shown and described in FIG. 2). In some embodiments, the method 400 can be executed by a disposition manager functioning in a network (e.g., disposition manager 106 connected to network 100 as shown and described in FIG. 1). In some embodiments, the method 400 is a sub-method of operation 320 and/or operation 330 of FIG. 3.

The method 400 can start at operation 410 and compare measured property values for a selected component to corresponding nominal property values and nominal property value tolerances for the selected component (e.g., measured property values 242, nominal properties 234 and property tolerances 236 of FIG. 2). Operation 420 can determine if each measured property value is within the tolerance range of the corresponding nominal property value. In the event at least one measured property value is not within the tolerance of the corresponding nominal property value, the method 400 proceeds to operation 430 and classifies the selected component as "damaged".

In some embodiments, the method 400 proceeds to operation 432 and determines if the component is functional. A damaged component can remain functional if it is safe and practical to use for its original purpose or a similar purpose. Operation 432 can determine if the component remains functional based on the type of out-of-tolerance property and the magnitude of the difference between the out-of-tolerance property value and the nominal property value. In some embodiments, operation 432 can determine if the component remains functional based on a performance characteristic (e.g. a performance characteristic estimated in operation 340 and further described hereinafter with respect to FIG. 5). In some embodiments, operation 432 determines if a component is functional according to a model based on a set of training data (as described hereinafter with respect to FIG. 7).

If operation 432 determines the component is functional, operation 434 classifies the component as "reusable". If operation 432 determines the component is not functional, the method 400 proceeds to operation 436. Operation 436 determines if the component is recyclable. A recyclable component can be re-processed into a useful product. Operation 436 can determine if a component is recyclable based on material information contained in specification data of the damaged component (e.g., specification data 232 of FIG. 2). In some embodiments, operation 436 determines if a component is recyclable according to a model based on a set of training data (as described hereinafter with respect to FIG. 7). If operation 436 determines the component is recyclable, then operation 438 classifies the component as "recyclable". If operation 436 determines the component is not recyclable, then operation 440 classifies the component as "unsalvageable".

Referring again to operation 420, in the event each measured property value is within the tolerance of the corresponding nominal property value, the method 400 proceeds to operation 450 and classifies the selected component as "undamaged".

Following is a non-limiting example of the method 400 applied to a damaged vehicle wheel. A vehicle wheel can be associated with numerous dimensional property values and tolerances, aesthetic property values and tolerances, and other property values and tolerances. Operation 410 can compare a measured diameter of the wheel (e.g., based on measurements extracted from a photograph, or measurements calculated by a CMM) to the corresponding diameter and tolerance listed in the specification of the wheel. Operation 410 can further compare an identified scratch on a sealing surface of the wheel to aesthetic properties and tolerances related to sealing surface scratches. Operation 420 can determine that not all measured property values are within the specified tolerance of respective nominal property values based on the identified scratch being outside the aesthetic property value and tolerance for scratches on the sealing surface of the wheel (e.g., scratches shall not be wider than 0.010" or longer than 1.000"). Operation 430 can classify the wheel as "damaged" based on the determination made in operation 420. In some embodiments, the method 400 further determines the wheel remains functional in operation 432 and further classifies the wheel as "reusable" in operation 434 based on the type of out-of-tolerance property and the magnitude of the difference between the measured property value and the nominal property value and tolerance. The previous example is made for illustrative purposes and is not intended to limit the present disclosure.

Figure 5:
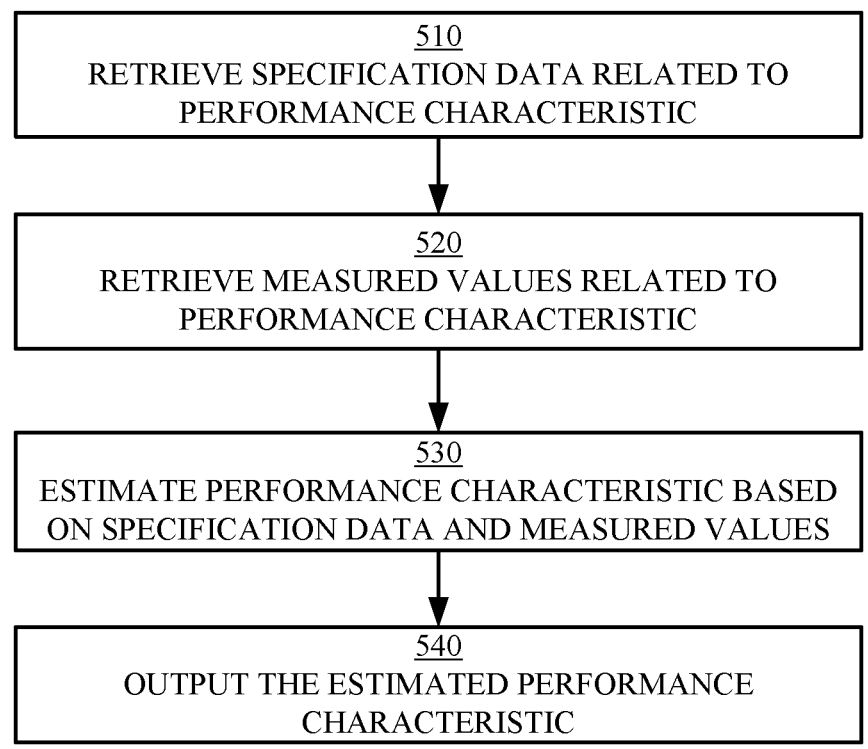
FIG. 5 illustrates a flowchart of an example method for estimating a performance characteristic of a damaged product in accordance with some embodiments of the present disclosure.

Referring now to FIG. 5, illustrated is an example flowchart for estimating a performance characteristic of a product, or portion thereof, in accordance with some embodiments of the present disclosure. In some embodiments, the method 500 can be executed by one or more processors executing a set of instructions (e.g., processors 205 executing estimation instructions 264 as shown and described in FIG. 2). In some embodiments, the method 500 can be executed by a disposition manager functioning in a network (e.g., disposition manager 106 connected to network 100 as shown and described in FIG. 1). In some embodiments, the method 500 is a sub-method of operation 340 of FIG. 3.

The method 500 begins at operation 510 by retrieving specification data related to the damaged product or portion thereof (e.g., specification data 232 of FIG. 2). Specification data can comprise, but is not limited to, aesthetic data, dimensional data, structural data, electrical data, chemical data, thermal data, material data, cost data, lifespan data, statistical data, risk data, and other data related to the product.

Operation 520 retrieves measured property values related to the damaged product or portion thereof (e.g., measured property values 242 of FIG. 2). Operation 530 estimates a performance characteristic for the product, or portion thereof, based on the measured property values and the specification data. A performance characteristic can comprise a characteristic derived from the specification data and one or more measured property values of the damaged product or portion thereof.

As a first example, a performance characteristic can comprise a percentage of an original property value. In such an example, the performance characteristic can be calculated in operation 530 by dividing a measured property value retrieved in operation 520 by a nominal property value retrieved in operation 510. For example, a performance characteristic for a battery of a damaged cell phone can comprise a percentage calculated by dividing a measured battery life of a damaged battery of a cell phone by a nominal battery life listed in a specification for the battery. The previous example is made for illustrative purposes and is not intended to limit the present disclosure.

As a second example, a performance characteristic can comprise an updated property value for a damaged product such as a maximum load. For example, a support beam on a bridge could be partially fractured and retain an estimated 10% of its original flexural strength based on information retrieved from operations 510 and 520. An updated maximum load property value of the bridge can be estimated in operation 530 by calculating the effect of the partially fractured beam on the load capacity of the bridge based on calculations retrieved from the specification data for the bridge in operation 510. Operation 530 can estimate multiple maximum load values based on various tolerance stack-ups in the bridge assembly. The previous example is made for illustrative purposes and is not intended to limit the present disclosure.

As a third example, a performance characteristic can comprise an estimated lifespan. For example, a vehicle frame can be corroding due to rust. Non-destructive test data can be collected at repeated intervals in operation 520. Operation 530 can estimate a rate of corrosion based on the data collected in operation 520. Operation 530 can further estimate the time until the vehicle frame will be unable to support a nominal load capacity as retrieved from specification data in operation 510. The previous example is made for illustrative purposes and is not intended to limit the present disclosure.

Operation 540 outputs the estimated performance characteristic. Operation 540 can comprise presenting the estimated performance characteristic on a user interface and/or temporarily or permanently storing the estimated performance characteristic in a non-transitory computer readable storage medium.

Figure 6:
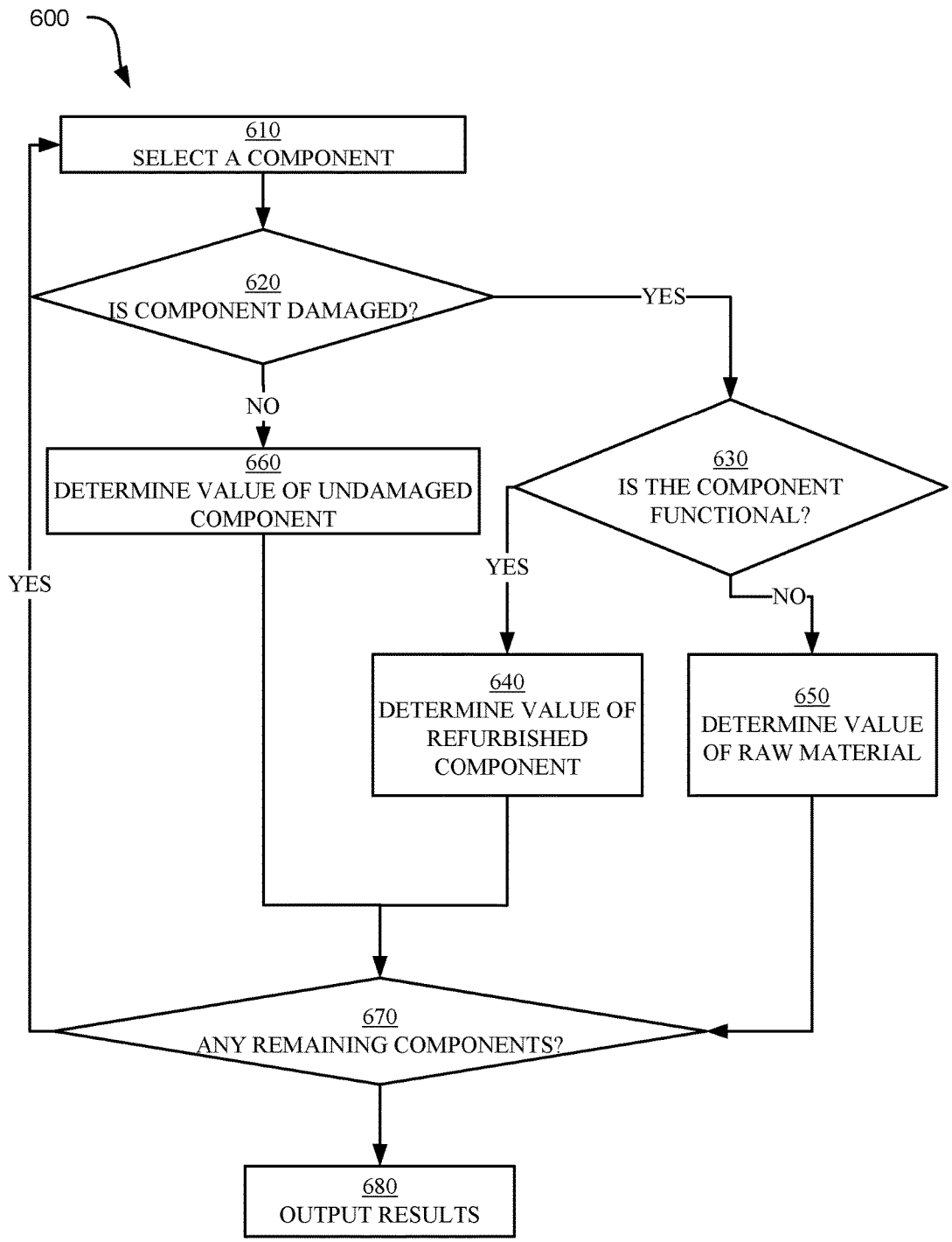
FIG. 6 illustrates a flowchart of an example method for estimating a salvage value of a damaged product in accordance with some embodiments of the present disclosure.

Referring now to FIG. 6, illustrated is an example flowchart for estimating a salvage value of a damaged product, or portion thereof, in accordance with some embodiments of the present disclosure. In some embodiments, the method 600 can be executed by one or more processors executing a set of instructions (e.g., processors 205 executing estimation instructions 264 as shown and described in FIG. 2). In some embodiments, the method 600 can be executed by a disposition manager functioning in a network (e.g., disposition manager 106 connected to network 100 as shown and described in FIG. 1). In some embodiments, the method 600 is a sub-method of operation 350 of FIG. 3.

The method 600 begins at operation 610 by selecting a component of the damaged product. Operation 620 determines if the component is damaged. Operation 620 can determine if a component is damaged based on determinations made in operations 320 and 330 of FIG. 3.

In the event the component is damaged, the method 600 proceeds to operation 630 and determines if the component is still functional. Operation 630 can use one or more estimated performance characteristics from operation 340 to determine if the component is still functional. Operation 630 can also use a type of out-of-tolerance measured property value and a magnitude of a difference between the out-of-tolerance measured property value and the nominal property value to determine if the component is still functional.

If the component is still functional, the method 600 proceeds to operation 640 and determines a value of the refurbished component. The value of the refurbished component can be based on one or more of an original value of the component, a model number of the component, a time (e.g., a time of use, a time between original release of the model number and the current time, etc.), a difference between one or more measured property values and one or more nominal property values related to the component, one or more performance characteristics of the component, a cost associated with repairing and/or refurbishing the component, one or more inputs by a user, and/or other variables. The method 600 can then proceed to operation 670 (described hereinafter).

In the event operation 630 determines the component is not functional, the method 600 proceeds to operation 650 and determines a value of the raw material. Operation 650 can determine a value of the raw material based on a volume and/or weight of the raw material and a recycle value of the raw material. The method 600 can then proceed to operation 670 (described hereinafter).

Referring back to operation 620, in the event the component is not damaged, the method 600 proceeds to operation 660 and determines a value of the undamaged component. The value of the undamaged component can be based on one or more of an original value of the component, a model number of the component, a time (e.g., a time of use, a time between original release of the model number and the current time, etc.), a difference between one or more measured property values and one or more nominal property values of the component (e.g., where a measured property value is within tolerance but nonetheless deviates from a nominal property value), one or more performance characteristics of the component, one or more inputs by a user, and/or other variables. The method 600 can then proceed to operation 670.

Operation 670 determines if there are additional components requiring an estimated salvage value. In the event there are additional components requiring an estimated salvage value, the method 600 returns to operation 610 and selects a new component. In the event there are no additional components requiring an estimated salvage value, the method 600 proceeds to operation 680 and outputs the results. Operation 680 can comprise presenting the results on a user interface, and/or temporarily or permanently storing the results in a non-transitory computer readable storage medium. Operation 680 can output a salvage value of the damaged product (i.e., the assembly) and/or the salvage value of one or more individual components of the damaged product according to various embodiments.

As a non-limiting example of the method 600, consider a damaged cell phone. Operation 610 selects a cell phone cover from the damaged cell phone. Operation 620 determines if the cell phone cover is damaged. If the cell phone cover is not damaged, operation 660 determines a re-sale value of the cell phone cover based on the undamaged condition (e.g., re-sale value to a cell phone user or a cell phone manufacturing facility). If operation 620 determines the cell phone cover is damaged, operation 630 determines if the component is functional. For instance, a cell phone cover can have a numerous scratches yet remain functional. In such a case, operation 640 determines a value of the refurbished component. In an alternative instance, operation 630 can determine the cell phone cover is non-functional (e.g., broken) and proceed to operation 650. Operation 650 can determine the value of the raw material of the of the broken cell phone cover in the event the material can be recycled and/or reprocessed. For example, the cell phone cover can be made of a thermoplastic polymer which can be recovered, compounded, and re-molded. Operation 650 can determine, based on information contained in the specification data of the cell phone cover (e.g., specification data 232 of FIG. 2), a volume of the cell phone cover (e.g., based on a CAD model of the cell phone cover), a density of the thermoplastic compound contained in the cell phone cover, and a recycle value per unit weight associated with the thermoplastic compound contained in the cell phone cover. Operation 650 can multiply the volume of the cell phone cover by the density of the thermoplastic compound by the recycle value per unit weight of the thermoplastic compound to generate a salvage value of the non-functional cell phone cover that is part of the damaged cell phone. The previous example is made for illustrative purposes and is not intended to limit the present disclosure.

Figure 7:
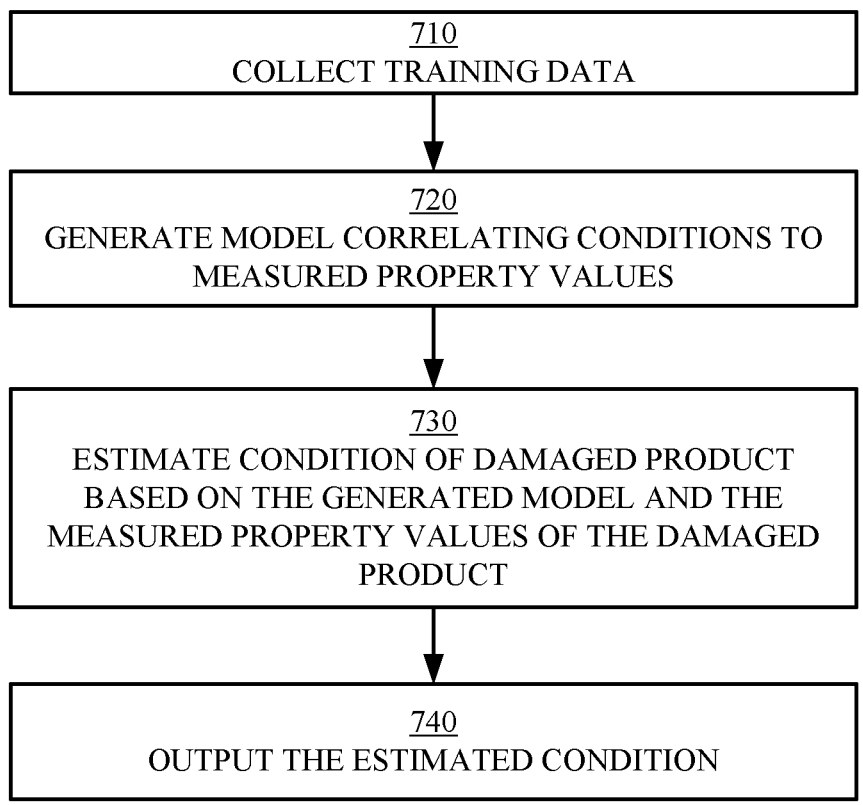
FIG. 7 illustrates a flowchart of an example method for predicting a condition of a component of a damaged product in accordance with some embodiments of the present disclosure.

Referring now to FIG. 7, illustrated is an example flowchart for estimating a condition of a damaged product, or portion thereof, in accordance with some embodiments of the present disclosure. In some embodiments, the method 700 can be executed by one or more processors executing a set of instructions (e.g., processors 205 executing training instructions 266 as shown and described in FIG. 2). In some embodiments, the method 700 can be executed by a disposition manager functioning in a network (e.g., disposition manager 106 connected to network 100 as shown and described in FIG. 1).

The method 700 begins by collecting training data in operation 710. Training data can comprise measured property values, images, and/or user-input annotations related to respective units of a product. In some embodiments, the training data collected in operation 710 is consistent with training data 244 of FIG. 2.

In operation 720, the method 700 generates a model correlating respective annotated conditions to respective measured property values and/or respective image characteristics for respective units of the product. Annotated conditions can comprise, but are not limited to: "damaged", "undamaged", "reusable", "recyclable", and "unsalvageable". In some embodiments, the conditions "reusable", "recyclable", and "unsalvageable" are sub-conditions of the condition "damaged". The aforementioned conditions are example conditions and other conditions can be used (e.g., a scale of 1-10, etc.).

As will be appreciated by one of skill in the art, the model generated in operation 720 can correlate multiple property values to a variety of conditions using techniques known in the art such as, but not limited to, linear regression, multiple regression, analysis of variance (ANOVA), multivariate analysis of variance (MANOVA), principal components analysis (PCA), factor analysis, correspondence analysis (CA), clustering, and multivariate statistical analysis techniques.

In operation 730, the method 700 estimates a condition of a damaged product, or portion thereof, based on the model generated in operation 720 and further based on measured property values and/or images collected from the damaged product, or portion thereof. In some embodiments, operation 730 further estimates an uncertainty (e.g., confidence, error, etc.) of the estimated condition based on limitations of the model generated in operation 720.

In operation 740, the method 700 outputs the estimated condition, and, in some embodiments, the estimated uncertainty. In some embodiments, operation 740 outputs the information to a user interface. In some embodiments, operation 740 outputs the information to a non-transitory computer readable storage medium.

As a non-limiting example of the method 700, consider bridge inspections. Operation 710 can collect a repository of photographs, radiographic images, ultrasonic images, and/or eddy current test (ECT) results for respective bridges and respective conditions of the respective bridges as documented by a bridge inspector. Operation 720 can generate a model using the collected training data. For example, the model could automatically assign a condition of "damaged" to any bridge with a load rating above a first threshold and having at least two sequential ECT disruptions above a second threshold (e.g., indicating a crack in a weld) based on 94% of instances of sequential ECT disruptions above the second threshold for bridges with load ratings above the first threshold in the training data resulting in a "damaged" condition for the bridge. The model could further indicate a level of uncertainty associated with the estimated "damaged" condition (e.g., indicate that 94% of data agrees with the estimated condition). The previous example is made for illustrative purposes and is not intended to limit the present disclosure.

Figure 8:
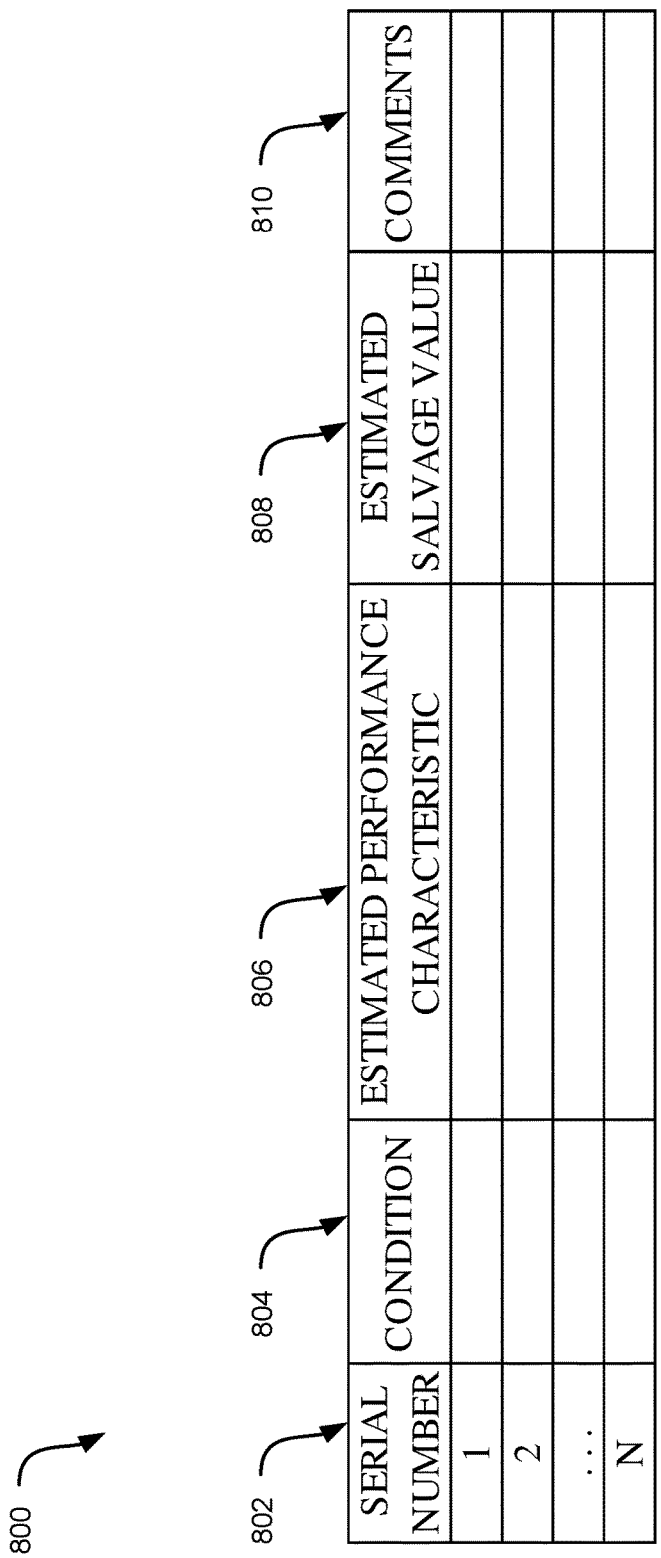
FIG. 8 illustrates a block diagram of an example user interface in accordance with some embodiments of the present disclosure.

Referring now to FIG. 8, illustrated is an example user interface presenting output from a disposition manager in accordance with some embodiments of the present disclosure. In some embodiments, FIG. 8 illustrates an example user interface output by, for example, disposition manager 106 of FIG. 1 and/or disposition manager 200 of FIG. 2. In some embodiments, user interface 800 is generated based on execution of instructions 260 of FIG. 2 according to any one or more of the flowcharts illustrated in FIGS. 3-7.

User interface 800 can indicate a plurality of serial numbers 802 where each serial number uniquely identifies a product and/or one or more components of a product. Serial numbers 802 can be user defined or automatically generated. Although serial numbers 802 shown in user interface 800 comprise sequential numbers (e.g., 1, 2, to N, where N represents a positive integer), serial numbers 802 can comprise any alphanumeric or graphic identifier.

User interface 800 can further comprise a condition 804 for each serial number 802. Conditions 804 can be based on output from operations 320 or 330 of FIG. 3, the method 400 of FIG. 4, or the method 700 of FIG. 7. Condition 804 can comprise conditions such as, but not limited to: "damaged", "undamaged", "reusable", "recyclable", "unsalvageable", or other conditions.

User interface 800 can further comprise an estimated performance characteristic 806 for each serial number 802. Estimated performance characteristics 806 can be based on output from operation 340 of FIG. 3 and/or output from the method 500 of FIG. 5.

User interface 800 can further comprise an estimated salvage value 808 for each serial number 802. Estimated salvage values 808 can be based on output from operation 350 of FIG. 3 and/or output from the method 600 of FIG. 6.

User interface 800 can further comprise comments 810 for each serial number 802. Comments 810 can be populated based on user input.

Any of the serial number 802, condition 804, estimated performance characteristic 806, and estimated salvage value 808 can be overridden and populated with a new value based on user input.

As will be appreciated by one of skill in the art, the user interface 800 can include more, fewer, and/or different outputs than the outputs shown.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
   extracting a set of data corresponding to a cell phone, wherein the cell phone comprises at least a first component and a second component, and wherein the set of data comprises dimensional data of the first component measured by a coordinate measuring machine (CMM) and image data of the second component obtained from at least one photograph of the cell phone;
   classifying the first component as damaged based on the dimensional data of the first component comprising unacceptable dimensions according to an acceptable range of dimensions stored in a specification of the first component, wherein the specification comprises a computer-aided design (CAD) model of the first component, material data of the first component, and at least a nominal modulus and a nominal strength of the first component;
   classifying the second component as undamaged based on the image data of the second component comprising acceptable image data according to a model, wherein the model is generated based on training data associated with the second component;

wherein the training data comprises respective image data and respective conditions for a plurality of respective components that have a similar function as the second component;

wherein the respective image data and the respective conditions comprise image data of at least one component associated with an undamaged condition, image data of at least one component associated with a damaged condition, image data of at least one component associated with a reusable condition, image data of at least one component associated with a recyclable condition, and image data of at least one component associated with an unsalvageable condition;

wherein the model generated based on the training data correlates the respective conditions to the respective image data;

determining a re-sale value of the second component based on classifying the second component as undamaged;

estimating a performance characteristic of the first component based on an updated property value of the first component, wherein the updated property value comprises a modulus of the first component and a strength of the first component, wherein the modulus and the strength are based on the dimensional data of the first component and the material data of the first component, wherein the performance characteristic comprises a percentage determined by dividing the updated property value by a nominal property value stored in the specification of the first component;

estimating a salvage value of the first component in response to determining that a material of the first component is a recyclable thermoplastic material based on the specification of the first component, wherein the salvage value of the first component is based on an amount of recyclable material in the first component and a value of the recyclable material, wherein the amount of recyclable material in the first component is retrieved from the CAD model; and presenting, to a user interface, an indication that the first component is damaged, the performance characteristic of the first component, and the salvage value of the first component, and presenting an indication that the second component is undamaged and the re-sale value of the second component.

\* \* \* \* \*